(12) United States Patent
Düvel et al.

(10) Patent No.: US 10,670,135 B2
(45) Date of Patent: Jun. 2, 2020

(54) SUPPORT APPARATUS FOR GEARING PAIR AND INDUSTRIAL APPLICATION

(71) Applicant: FLENDER GMBH, Bocholt (DE)

(72) Inventors: Volker Düvel, Bocholt (DE); Marco Hoffman, Essen (DE); Philipp Leuer, Essen (DE); Simon Becka, Wesel (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 16/295,728

(22) Filed: Mar. 7, 2019

(65) Prior Publication Data
US 2019/0277390 A1 Sep. 12, 2019

(30) Foreign Application Priority Data
Mar. 8, 2018 (EP) .................................... 18160708

(51) Int. Cl.
*F16H 57/021* (2012.01)
*B02C 4/42* (2006.01)

(52) U.S. Cl.
CPC .......... *F16H 57/021* (2013.01); *B02C 4/426* (2013.01)

(58) Field of Classification Search
CPC ............................. F16H 57/021; B02C 4/426
See application file for complete search history.

(56) References Cited

U.S. PATENT DOCUMENTS

| | | | | |
|---|---|---|---|---|
| 5,005,775 A * | 4/1991 | Jakobs | ..................... | B02C 4/426 241/232 |
| 5,192,030 A * | 3/1993 | Jakobs | ..................... | B02C 4/426 241/101.2 |
| 5,542,618 A * | 8/1996 | Andersen | ................ | B02C 4/426 241/227 |
| 5,553,796 A * | 9/1996 | Bettenworth | ........... | B02C 4/426 241/230 |
| 5,779,126 A | 7/1998 | Chun | | |
| 2019/0277390 A1 * | 9/2019 | Duvel | ................... | F16H 57/021 |

FOREIGN PATENT DOCUMENTS

| | | | |
|---|---|---|---|
| DE | 4019363 C1 | 8/1991 | |
| DE | 19619110 A1 | 11/1997 | |
| DE | 19822341 B4 * | 10/2007 | ............. B02C 4/426 |
| EP | 0775525 A1 | 5/1997 | |

OTHER PUBLICATIONS

Hirt M: "Plantary Gear Units for State-of-the-Art Milling Techniques in Thecement Industry", Man Forschen Planen Bauen, Man Maschinenfabrik Augsburg-Nuernberg A.G.; Augsburg, DE, pp. 60-65, XP000517015, Figures 5, 6*—; 1994.

* cited by examiner

*Primary Examiner* — Vicky A Johnson
(74) *Attorney, Agent, or Firm* — Henry M. Feiereisen LLC

(57) ABSTRACT

A support apparatus for a first gearing and a second gearing or for a drive includes first and second support flanges, a first support mounted to the first support flange and destined to introduce a first supporting force into the second support flange, and a second support mounted on the second support flange and destined to introduce a second supporting force into the first support flange, wherein the first support is sized to extend through the second support.

20 Claims, 4 Drawing Sheets

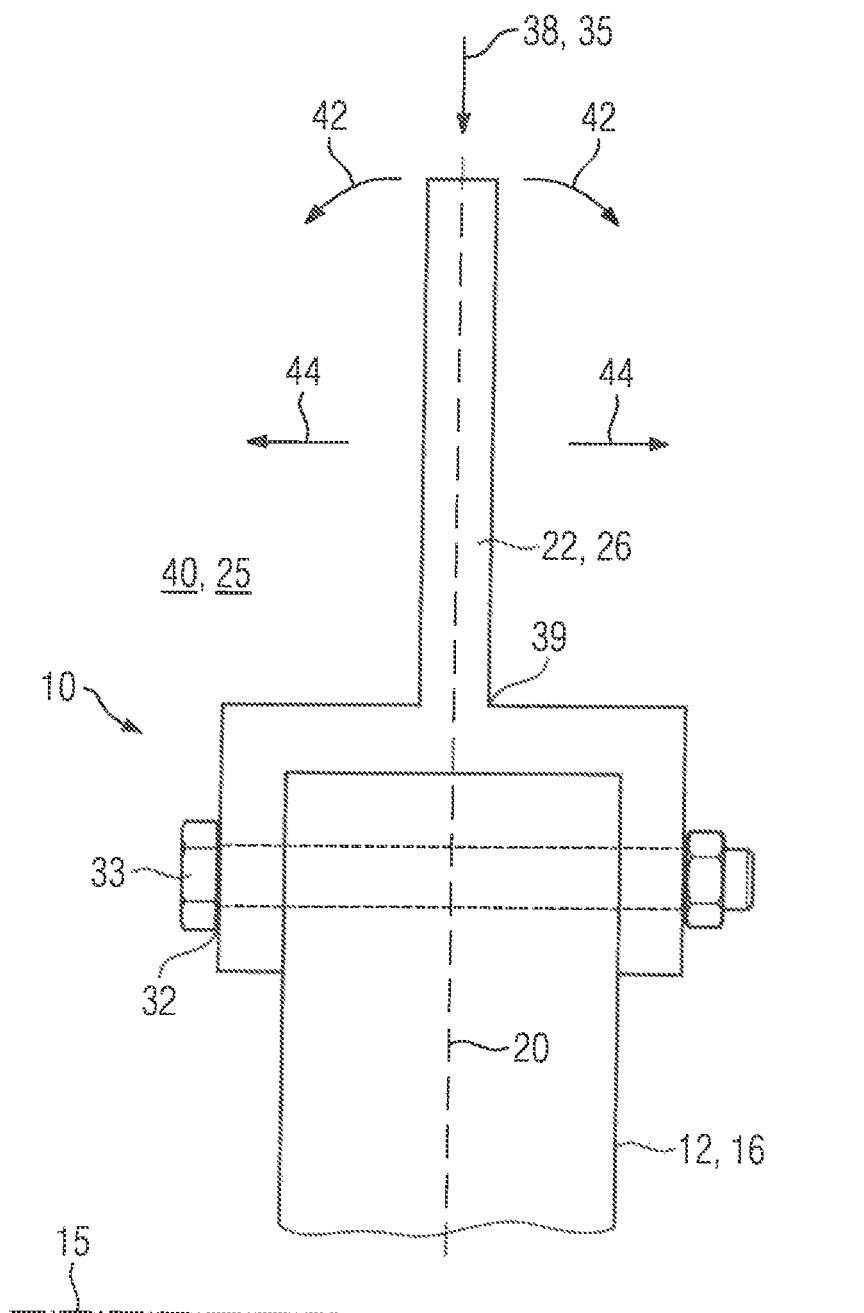

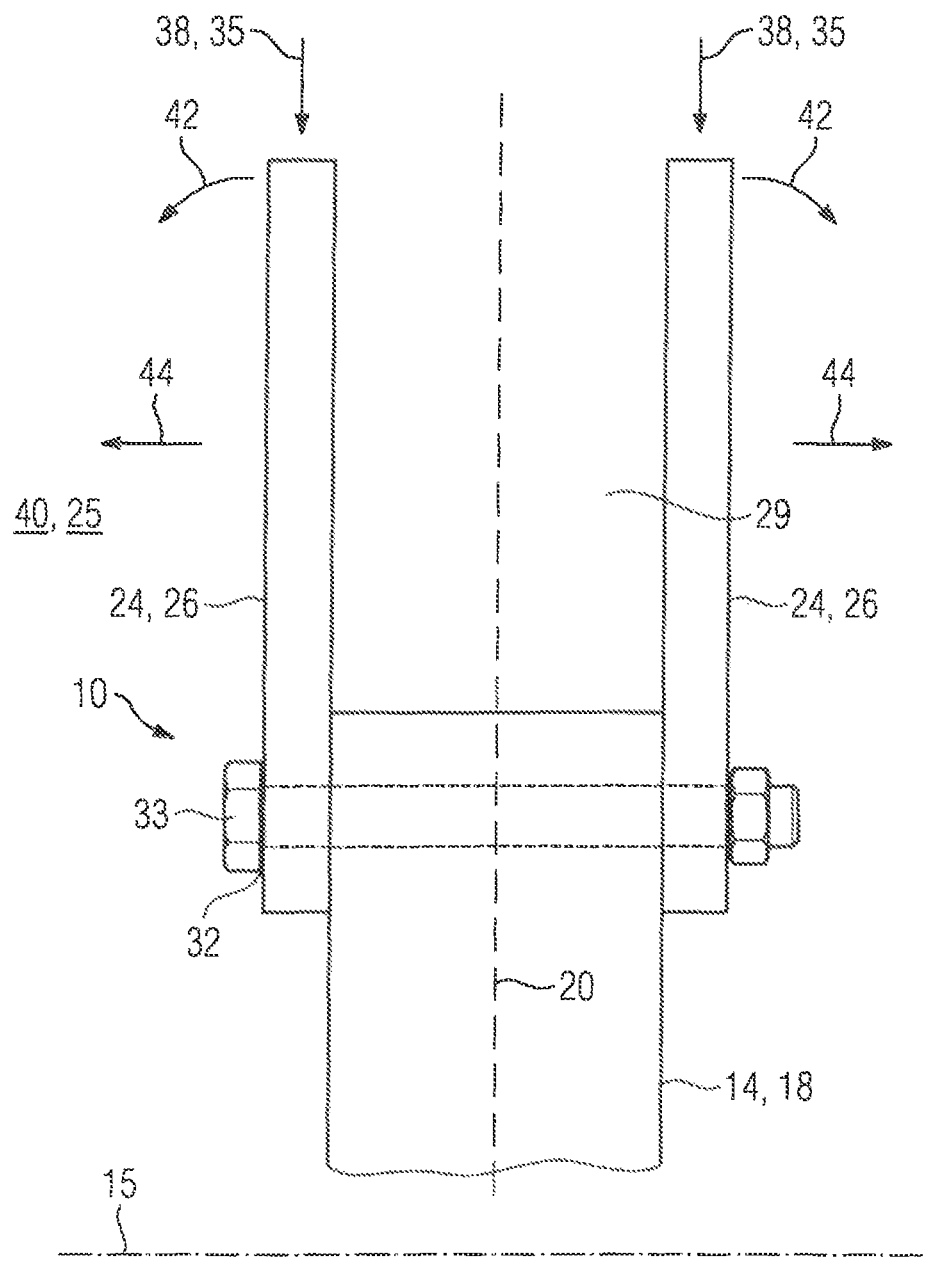

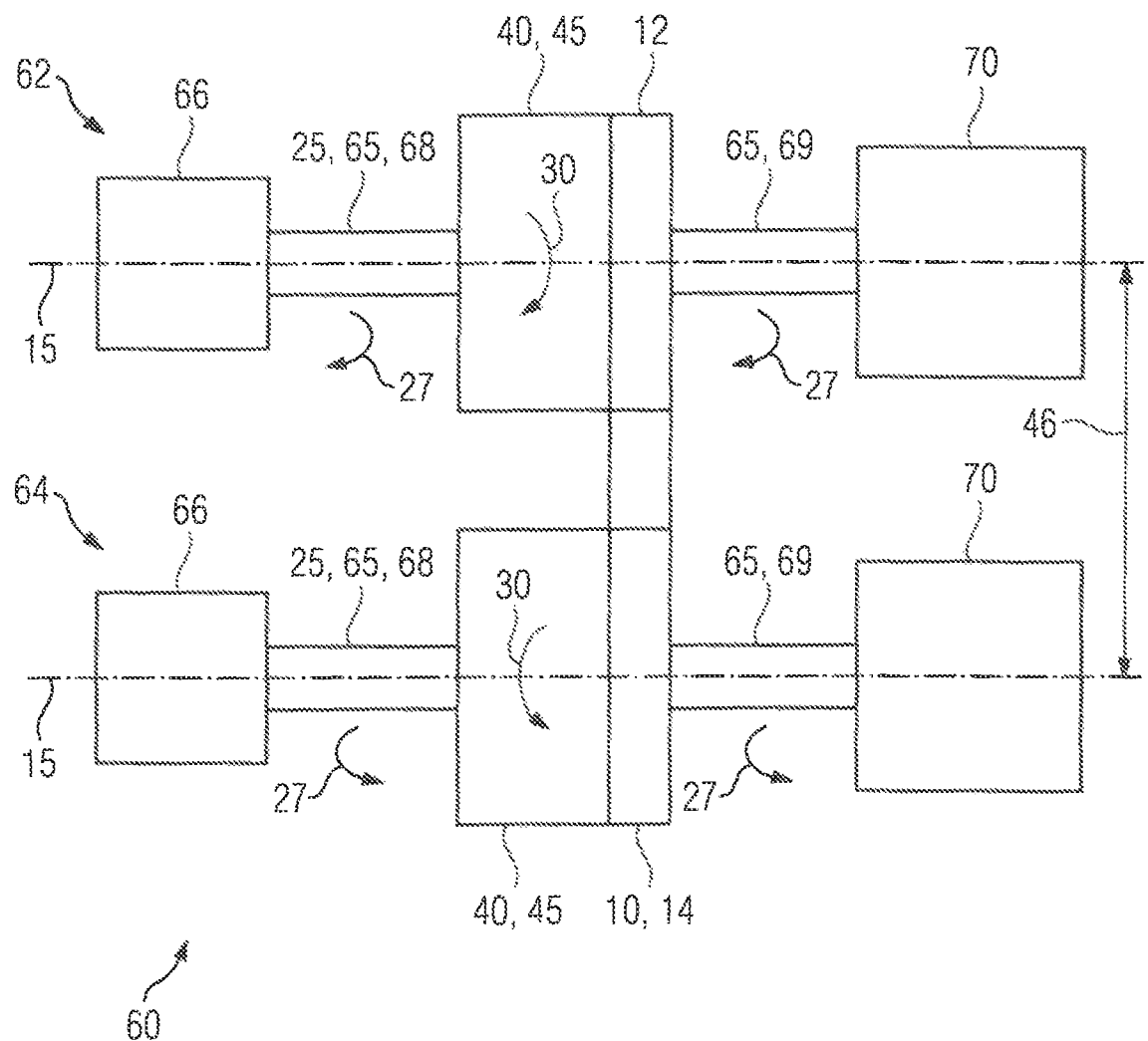

SUPPORT APPARATUS FOR GEARING PAIR AND INDUSTRIAL APPLICATION

CROSS-REFERENCES TO RELATED APPLICATIONS

This application claims the priority of European Patent Application, Serial No. EP18160708.6, filed Mar. 8, 2018, pursuant to 35 U.S.C. 119(a)-(d), the disclosure of which is incorporated herein by reference in its entirety as if fully set forth herein.

BACKGROUND OF THE INVENTION

The present invention relates to a support apparatus for a gearing pair and to an industrial application, which is equipped with such a support apparatus.

The following discussion of related art is provided to assist the reader in understanding the advantages of the invention, and is not to be construed as an admission that this related art is prior art to this invention.

The plant engineering industry requires applications with ever-increasing mechanical efficiency. At the same time, such applications need to have high reliability, durability, compactness and ease of manufacture. Hence, enhanced-performance applications with multiple gearings require a support apparatus for multiple gearings that offers a simple way of installing multiple gearings for applications with increased mechanical efficiency and provides an improvement in at least one of the aspects outlined.

It would therefore be desirable and advantageous to address prior art shortcomings.

SUMMARY OF THE INVENTION

According to one aspect of the present invention, a support apparatus for a first gearing and a second gearing or for a drive includes first and second support flanges, a first support mounted to the first support flange and destined to introduce a first supporting force into the second support flange, and a second support mounted on the second support flange and destined to introduce a second supporting force into the first support flange, wherein the first support is sized to extend through the second support.

The present invention resolves prior art problems by providing a support apparatus which is embodied for attaching a gearing pair, i.e. a first and a second gearing. The support apparatus includes two gearing supports arranged adjacent to one another. Each of the gearing supports includes a support flange, i.e. a first and second support flange. Herein, a first support is attached to the first support flange. The first support is embodied to introduce a first supporting force into the second support flange. The first supporting force is caused, for example, by a reactive torque, which is turn caused by a driving torque, which is introduced into the first gearing. Similarly, the second support is embodied to introduce a second supporting force into the first support flange. Depending on the orientation of the driving torques, and hence depending on the orientations of the reactive torques, the supporting forces can in each case be embodied as tensile or compressive forces. Herein, the supporting forces are introduced radially, tangentially and/or by a combination thereof into the respective support flange. This overall achieves an advantageous mounting of the first and second gearing during normal operation. According to the invention, the second support is embodied such that the first support extends through the second support. This permits a close spatial arrangement of the two supports and enables a favorable and deformation-resistant attachment of the supports to their respective support flanges. As a result, higher supporting forces can be introduced into the support flanges with a constant mass of the support arms. Alternatively, constant supporting forces can be introduced into the support flanges with a reduced mass of the support arms. The improved material utilization achieved in this way also offers a longer service life and hence greater reliability. The support apparatus according to the invention is simple to manufacture and inspect and is hence cost-efficient. Herein, the support apparatus according to the invention is used for gearings embodied to transmit powers of 100 kW to 10 MW, in particular 200 kW to 7.0 MW. Instead of gearings, the support apparatus according to the invention can also be connected to drive means such as, for example, electric motors or hydraulic motors.

According to another advantageous feature of the present invention, the first support can be single-armed and the second support can be double-armed. Herein, the term "single-armed" should be understood to mean that, at least section-wise, the first support has only one substantially planar component and, in this section, can be described mechanically as a disk. The term "double-armed" should be understood as meaning that, at least section-wise, the second support has only two planar components arranged substantially in parallel, which once again can be described as a disk in the corresponding sections. As a result, the second support has a clear interspace, which is embodied, at least section-wise, to accommodate the single-armed first support. A combination of a single-armed first support and a double-armed second support enables in a simple way the first support to extend through the second support. Corresponding supports can be produced quickly in a simple and cost-efficient manner. Furthermore, single-armed and double-armed supports can be embodied with recesses allowing weight to be saved with the supports, thus simplifying the assembly of the claimed support apparatus. Furthermore, correspondingly, single-armed and double-armed supports can be mechanically calculated in a simple manner, thus permitting rapid adaptation of the claimed solution to different applications.

According to another advantageous feature of the present invention, the first and second supports can be separated from one another by intersection in two sections. A two-section separation should be understood to mean that two sectional planes are required to cut the first support free from the second support in the terms of engineering mechanics. Overall, this ensures a simpler design.

According to another advantageous feature of the present invention, the first support can include a support arm, which is mounted in a flange main plane of the first support flange. A flange main plane is a plane that is substantially perpendicular to at least one main axis of a gearing, which is mounted on the support apparatus. Herein, the main axis is, for example, the axis about which a gearing input shaft and/or gearing output shaft rotates in normal operation. The support arm on the first support is embodied to reach over the second gearing support, and hence the second support flange. Thus, the support arm on the first support flange is embodied to introduce a supporting force laterally outwardly into the second support flange. Positioning of the support arm in the flange main plane causes radial forces to act on the support arm with a reduced lever length in the axial direction, and hence substantially free of bending loads, on the first support flange. Hence, in normal operation, the bending stress on the first support flange from the support arm is infinitesimally negligible. One aspect of the proposed solution resides in a recognition that the bending stress of support flanges substantially determines the mechanical strength of support flanges and hence of corresponding support apparatuses. As a result, a first support with a support arm extending substantially in a flange main plane provides increased mechanical strength of the support apparatus and hence an opportunity for enhancing the performance of a connected mechanical application. Similarly, the increased strength increases the service life and reliability of the first support flange. In addition, this reduces bending stresses on detachable attachment means, and axial and radial forces acting thereupon, with which the first support is attached to the first flange support. As a result, it is, for example, possible to use screws as detachable attachment means. The need for complex detachable attachment means, such as fit bolts for example, is thus not consistently necessary or can advantageously be dispensed with. Complex attachment means of this kind can now be replaced by screws or pins with smaller sizes and lower quality grades, such as, for example, strength classes. Furthermore, the support arm can be embodied substantially symmetrically in the flange main plane. Such a configuration of the support arm is also referred to as a straddling arrangement.

According to another advantageous feature of the present invention, the second support can include two support arms, which are mounted on oppositely-facing end faces of the second support flange. Herein, between the support arms, there is a clear interspace, which serves at least partially to accommodate the support arm of the first support. Thus, the clear interspace between the support arms of the second support is divided substantially symmetrically by a flange main plane of the second support flange. As a result, similarly to the straddling arrangement of the support arm of the first support, the second support flange is only exposed to a reduced bending load, thus reducing its bending stress. Such a configuration further amplifies the advantages attained by a support apparatus according to the present invention.

According to another advantageous feature of the present invention, a strut can be mounted to an end of the first support arm and/or second support arm. The strut, which is mounted at the end of the support arm of the first support, is also coupled to the second support flange. The strut, which is mounted at the end of the support arm of the second support, is also coupled to the first support flange. The struts can each be coupled by an eye-bar connection to the corresponding support arm and thus transmit a supporting force to the first or second support flange. The strut is embodied to transmit a tensile force and/or compressive force so that different loading conditions, i.e. directions of rotation of gearing input shafts, can be accommodated by the support apparatus.

Furthermore, the struts can each be embodied for substantially bending-moment-free introduction of a tensile force or compressive force into the first or second support flange. To this end, the struts can each be connected to the first or second support and the first or second support flange such that the transmitted tensile force or compressive force also lies in the first or second flange main plane. For example, the tensile force or compressive force can be introduced into the first or second support flange free of any axial component. Herein, the tensile force or compressive force can be depicted as a combination of a radial force and a tangential force relative to the main axis of the respective gearing. For this purpose, a corresponding strut anchor can be mounted on the first and/or second support flange.

According to another advantageous feature of the present invention, the strut anchor can be attached to the first and/or second support flange on the first or second support. Herein, the strut anchor can in particular be embodied in one piece with the first or second support, i.e. molded-on. This simplifies the production of the first and/or second support flange. In particular, this enables the first and/or second support flange to be embodied substantially rotationally symmetrically with respect to the main axis of the associated gearing. Furthermore, a combination of the first or second support with the associated strut anchor reduces the number of components, in particular separate attachment means for the strut anchors, which in turn enables simpler installation. Furthermore, the combination of support flange and strut anchor enables the structural adaptation of a transition between the strut anchor and the associated support arm. Consequently, this enables the transition from the strut anchor to the support arm to be specifically constructed in terms of loading and materials and improved material utilization to be achieved.

Alternatively, it is also possible for at least one of the strut anchors to be directly formed on the first or second support flange. A strut anchor formed on the first or second support flange provides an easy possibility for introducing a supporting force introduced by a strut into the first or second support flange appropriately for the loading and material. Furthermore, a formed-on strut anchor saves on attachment means and installation costs compared to separate strut anchors in a differential construction method.

According to another advantageous feature of the present invention, at least one of the first and second support flanges can have at least one section which is radially shortened so as to reduce a main axis distance between the first and second gearings. Such radial shortening can be embodied as a deviation from a rotationally symmetrical basic shape of the first and/or second support flange. This can in particular be a truncated flange contour. The radially shortened first and/or second support flange serves to reduce a main axis distance between the main axes of the gearings. To this end, the support flanges can be arranged opposite one another such that the flange main planes of the two support flanges are substantially identical. Thus, the radial shortening of the support flanges enables more compact positioning of the gearings. Hence, the present invention can also be used in mechanical applications requiring a narrow main axis distance. As a result, a support apparatus according to the present invention has a wide range of application and enables a more powerful drive and/or gearings to be used in existing mechanical applications for which the maximum installation space available is defined by a main axis distance. Hence, existing industrial applications can be expanded in a simple manner and increased power density can be achieved.

According to another advantageous feature of the present invention, at least one of the first and second support flanges can be configured to form a housing component of the first or second gearing. Herein, the first and/or second support flange can in particular be embodied as an output-side housing section in which an output shaft of the corresponding gearing extends. This achieves a high degree of integration in the construction of an industrial application equipped with a corresponding support apparatus.

According to another aspect of the present invention, an industrial application includes a first gearing rotating in one direction, a first drive shaft disposed in driving relationship to the first gearing to enable supply of driving power to the first gearing, a second gearing rotating in another direction which is opposite to the one direction, a second drive shaft disposed in driving relationship to the second gearing to enable supply of driving power to the second gearing, and a support apparatus configured for attachment of the first and second gearings, said support apparatus comprising first and second support flanges, a first support mounted to the first support flange and destined to introduce a first supporting force into the second support flange, and a second support mounted on the second support flange and destined to introduce a second supporting force into the first support flange, wherein the first support is sized to extend through the second support.

An industrial application according to the present invention thus includes a first gearing to which driving power is supplied via a first gearing input shaft, i.e. a driving torque with an operating speed. The industrial application also includes a second gearing, which, substantially analogously to the first gearing, can be supplied with driving power via a second gearing input shaft. In normal operation, the first and second gearing input shafts have opposite directions of rotation which give rise to the corresponding reactive torques. The first and second gearings are attached to a support apparatus in which the reactive torques are generated by the driving powers and in which a loading state is established in dependence on the available driving power. For the advantageous accommodation of the existing loading state, the support apparatus is embodied according to one of the above-described embodiments. The corresponding support apparatus simplifies the installation of the industrial application. The increased reliability and service life of the support apparatus reduces the maintenance outlay for the industrial application. Furthermore, the increased mechanical strength of the support apparatus endows the industrial application with a higher driving power and thus increases the productivity of the industrial application. The industrial application can for example be embodied as a mill, rolling mill, cement mill, sugar mill, extruder, conveyer system, rock crusher, roller crusher, roller press, roll press, pump, ventilator, ship's propulsion or lifting apparatus.

According to another advantageous feature of the present invention, at least one of the first and second gearing can be embodied as a planetary gearing. Planetary gearings offer a high power density and enable the increased mechanical strength of the support apparatus to be utilized to a particular degree. As a result, the advantages of a support apparatus according to the present invention are achieved to a high degree overall. Alternatively, each of the gearings can in each case also be embodied as a spur gearing unit, a worm gearing unit or as a bevel gearing unit.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a schematic detailed longitudinal section of the support apparatus of FIG. 1;

FIG. 3 is a schematic further detailed longitudinal section of the support apparatus of FIG. 1; and FIG. 4 is a schematic overview of an industrial application according to the present invention.

DETAILED DESCRIPTION OF PREFERRED EMBODIMENTS

Figure 1:
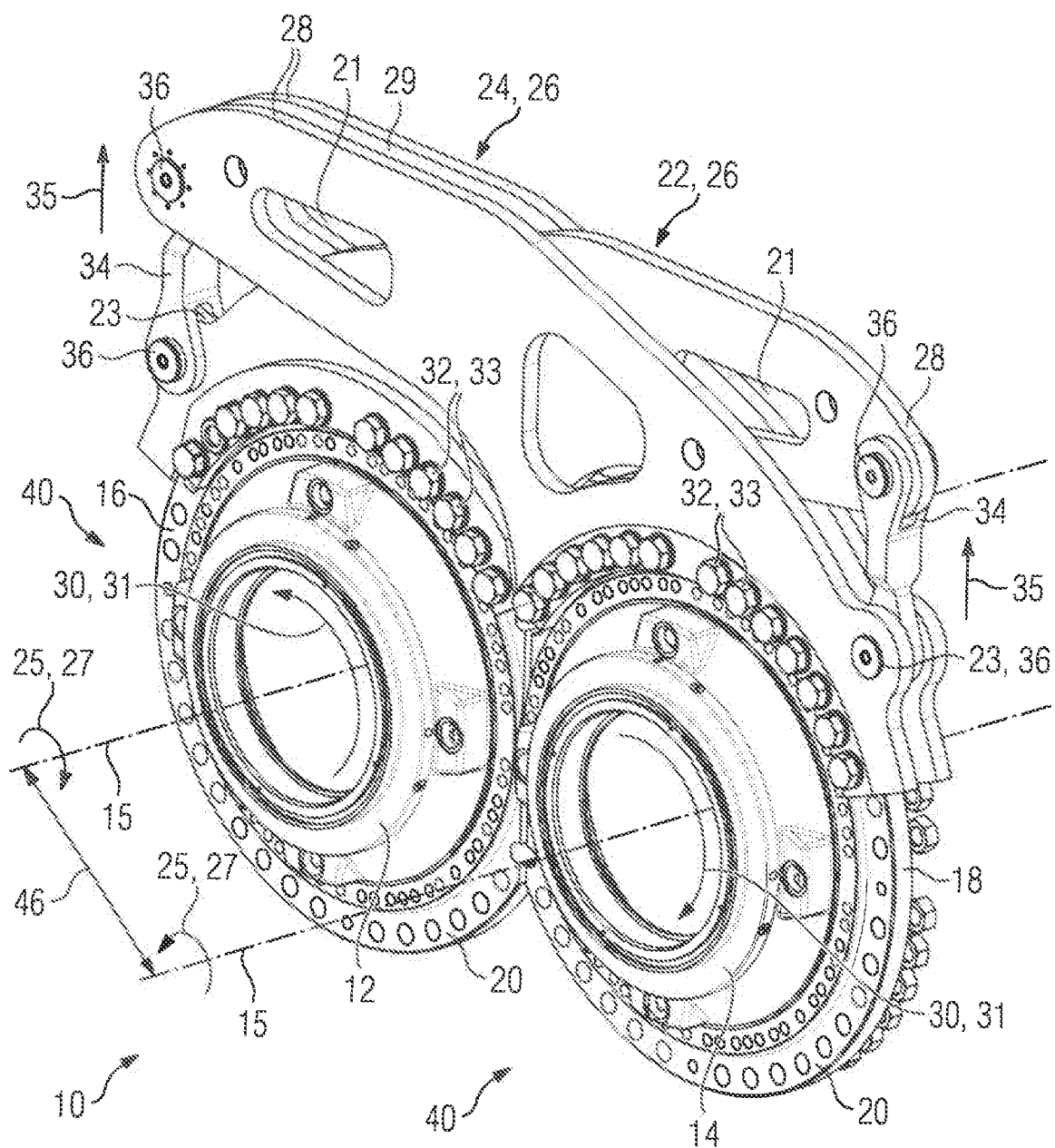
FIG. 1 is an oblique view of a support apparatus according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an oblique view of a support apparatus according to the present invention, generally designated by reference numeral 10. The support apparatus 10 includes a first gearing holder 12 and second gearing holder 14, each of which embodied to attach a gearing 40, which is not shown in further detail, to the support apparatus 10. The first gearing holder 12 includes a first support flange 16 and the second gearing holder 14 includes a second support flange 18. In the installed state, torques 25 are introduced into the gearings 40, which rotate about their main axes 15. The main axes 15 are spaced apart from one another by a main axis distance 46. Herein, the torques 25 have opposite directions of rotation 27. As a result, reactive torques 30 are generated in the gearing holders 12, 14, and hence in the support flanges 16, 18. Herein, the reactive torques 30 in each case have reaction directions 31 which are opposite to the corresponding introduced torques 25 of the gearing 40 on the respective gearing holder 12, 14. Hence, the first and second support flange 16, 18 are subjected to reactive torques 30 with opposite orientations. A first support 22 is attached to the first support flange 16 via a plurality of attachment means 33, which are accommodated in corresponding recesses 32 so that the reactive torque 30 acting on the first support flange 16 also acts on the first support 16. The first support 22 includes a support arm 26 which substantially reaches over the adjacently arranged second support flange 18. Herein, the support arm 26 of the first support 22 is substantially arranged in a flange main plane 20 of the first support flange 16. Herein, the flange main plane 20 should be understood to mean the plane which is defined by the recesses 32 for the attachment means 33 and herein lies substantially perpendicular to a corresponding main axis 15 of a gearing 40. Herein, the arrangement of the support arm 26 of the first support 22 in the flange main plane 20 of the first support flange 16 is also referred to as a straddling arrangement.

At one support arm end 28 of its support arm 26, the first support 22 is connected in an articulated manner via an eye-bar connection 36 to a strut 34. The strut 34 at the corresponding support arm-end 28 is in turn connected via a further eye-bar connection 36 to an attachment bearing 23, which is in turn embodied in one piece with the second support 24. The second support 24 is connected to the second support flange 18 via attachment elements 33. A reactive torque 30 that is produced by the torque 25 of a gearing 40 on the first gearing holder 12 is introduced into the second support flange 18 via the support arm 26 of the first support 22. Herein, the attachment mounting 23 on the second support flange 18 exerts a tensile force 35 on the corresponding strut 34. In a corresponding manner, a reactive torque 30, which it is established as a result of a torque 25 of a gearing 40 mounted on the second gearing holder 14, is introduced into the first support flange 16 via the second support 24.

The first support 22 includes only one support arm 26 and is hence embodied as single-armed. The second support 24 includes two support arms 26, which are substantially embodied as congruent and mounted on the second support flange 18 spaced apart from one another. Hence, the second support 24 is embodied as double-armed. The support arms 26 of the second support 24 are arranged spaced apart from one another such that the support arm 26 of the first support 22 extends through a clear space 29 between the support arms 26 of the second support 24. As a result, the first support 22 extends through the second support 24. Consequently, the support arm 26 of the first support 22 and the support arms 26 of the second support 26 are separated from one another by intersection in two sections. Furthermore, each of the support arms 26 in the support apparatus 10 is provided with openings 21 thus achieving better material utilization by the support arms 26. The arrangement of the support arms 26 of the first and second support 24 allows substantially purely coplanar forces and torques to be present in the flange main planes 20 of the first and second support flange 16, 18 and hence the first and second support flange 16, 18 are substantially bending-moment-free. This aspect is depicted in more detail in FIG. 2. Furthermore, the first and second support flanges 16, 18 are embodied, section-wise, as radially shortened on opposing faces in the region of the flange main planes 20. As a result, the main axis distance 46 is shorter than in the solutions known from the prior art.

FIG. 2 is a schematic detailed view of the embodiment according to FIG. 1 in the region of the first gearing holder 12. The first support 22 is attached via at least one attachment means 33 to the first support flange 16 which has corresponding recesses 32 for accommodating the attachment elements 33. Herein, the at least one attachment means 33 is embodied as a screw with a nut. The support arm 26 is embodied and arranged on the first support flange 16 such that the flange main plane 20 of the first support flange 16 divides the support arm 26 of the first support 22 substantially symmetrically. Herein, the support arm 26 is embodied as single-armed. The support arm 26 is acted upon by a bending force 38 resulting from the tensile force 35, which, in FIG. 1 is present in the strut 34 on the support arm end 28 of the support arm 26 of the first support 22. Due to the fact that the first support 22 is arranged substantially symmetrically relative to the flange main plane 20 of the first support flange 16, bending moments 42 by means of which a deflection 44 can be impressed on the support arm 26 and/or the first support flange 16 along a main direction of rotation 15 become zero. Thus, bending stresses due to bending moments 42 in the sense of FIG. 2 are avoided in the claimed support apparatus 10. In particular, mechanical stress is reduced in the region of a support arm root 39. The avoidance of bending moments 42 results in more favorable material stressing during the operation of the claimed support apparatus 10. This permits the connection of gearings 40 to the support apparatus 10 in which increased torques 25 are present while simultaneously keeping the material stressing in the first support flange 16 constant.

Corresponding to FIG. 2, FIG. 3 is a detailed view of the embodiment in FIG. 1. FIG. 3 shows a longitudinal section in the region of the second support flange 18 on the second gearing holder 14. A second support 24 is mounted on the second support flange 18 via attachment means 33 embodied as screws with nuts. To this end, the attachment means 33 are accommodated in recesses 32 in the second support 22 and the second support flange 18. The second support 18 includes two support arms 26 that are substantially parallel to one another. Between the support arms 26, there is a clear space 29, which is embodied to accommodate a support arm 26 of a first support 22 as in FIG. 2. As a result, it is possible for the first support 22 in FIG. 2 to extend through the second support 24. The support arms 26 of the second support 24 are oriented symmetrically to a flange main plane 20 that extends substantially centrally through the second support flange 18. Each of the support arms 26 in FIG. 3 is acted upon by a bending force 38, which is generated by a tensile force 35 that, in normal operation, occurs due to a tensile force 35 on at least one support arm end 28. The bending forces 38 act substantially parallel to the flange main plane 20 so that bending moments 42 capable of causing a deflection 44 of the support arms 26 along the main axis of rotation 15 become zero. The reduced material stressed achieved in this way ensures a longer service life of the second support 18. Alternatively, this enables the torque 25 transmitted via a gearing 40 mounted on the second gearing holder 14 to be increased and thus utilized better for the second support 24 and the second support flange 18.

FIG. 4 is a schematic view of the configuration of an industrial application 60 according to a first embodiment. The industrial application 60 includes two parallel strands 62, 64 in each of which a drive means 66 is arranged. The drive means 66 are each embodied as electric motors or internal combustion engines and each have a drive shaft 68. A driving power 65 with a specific torque 25 is transmitted via the drive shaft 68 to a gearing 40. The first gearing 40 in the first strand 64 and the second gearing 40 in the second strand 64 are each embodied as a planetary gearing 45 with a main axis 15. The main axes 15 are spaced apart from one another by a main axis distance 46. The first and second gearing 40 in each case cause a transformation of the driving power 65 in respect of torque and speed. With this transformation, an increase in the torque causes a reduction in the speed and vice versa. The substantially constant driving power 65 is in each case forwarded by the gearings 40 via an output shaft 69 to a mechanical application 70 by means of which the purpose of the industrial application 60 is fulfilled. The drive means 66 are embodied such that the drive shafts 68 have opposite directions of rotation 27. This causes opposite reactive torques 30 in the gearings 40, which are in turn accommodated by a common support apparatus 10. The support apparatus includes a first and a second gearing holder 12, 14 in each of which one of the gearings 40 is installed. Herein, the support apparatus 10 is embodied according to one of the above-described embodiments. The industrial application 60 can be embodied by a corresponding choice of the mechanical application 70 for example as a mill, roller mill, cement mill, sugar mill, extruder, conveyer system, rock crusher, roller crusher, roller press, roll press, pump, ventilator, ship's propulsion or lifting apparatus.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A support apparatus for a first gearing and a second gearing or for a drive, said support apparatus comprising:
a first support flange; and
a second support flange;
a first support mounted to the first support flange and configured to introduce a first supporting force into the second support flange; and
a second support mounted on the second support flange and configured to introduce a second supporting force into the first support flange,
wherein the first support is sized to extend through the second support.

2. The support apparatus of claim 1, wherein the first support is single-armed and the second support is double-armed.

3. The support apparatus of claim 1, wherein the first support and the second support are separated from one another by intersection in two sections.

4. The support apparatus of claim 1, wherein the first support comprises a support arm, which is mounted in a flange main plane of the first support flange.

5. The support apparatus of claim 4, further comprising a strut mounted to an end of the support arm and configured to introduce a tensile force and/or compressive force.

6. The support apparatus of claim 1, wherein the second support comprises two support arms, which are mounted on oppositely-facing end faces of the second support flange.

7. The support apparatus of claim 1, further comprising a strut having one end mounted to one end of the first support and another end mounted to one end of the second support for bending-moment-free introduction, relative to a flange main plane, of a tensile force or compressive force into the first or second support flange.

8. The support apparatus of claim 1, wherein at least one member selected from the group consisting of the first support and the second support is equipped with an attachment bearing.

9. The support apparatus of claim 8, wherein the attachment bearing is formed on the member.

10. The support apparatus of claim 1, wherein at least one of the first support flange and the second support flange has at least one section which is radially shortened so as to reduce a main axis distance between the first and second gearings.

11. The support apparatus of claim 1, wherein at least one of the first support flange and the second support flange is configured to form a housing component of the first or second gearing.

12. An industrial application, comprising:
a first gearing rotating in one direction;
a first drive shaft disposed in driving relationship to the first gearing to enable supply of driving power to the first gearing;
a second gearing rotating in another direction which is opposite to the one direction;
a second drive shaft disposed in driving relationship to the second gearing to enable supply of driving power to the second gearing; and
a support apparatus configured for attachment of the first and second gearings, said support apparatus comprising a first support flange and a second support flange, a first support mounted to the first support flange and configured to introduce a first supporting force into the second support flange, and a second support mounted on the second support flange and configured to introduce a second supporting force into the first support flange, wherein the first support is sized to extend through the second support.

13. The industrial application of claim 12, wherein at least one of the first and second gearing is embodied as a planetary gearing.

14. The industrial application of claim 12, wherein the first support comprises a support arm, which is mounted in a flange main plane of the first support flange.

15. The industrial application of claim 12, wherein the second support comprises two support arms, which are mounted on oppositely-facing end faces of the second support flange.

16. The industrial application of claim 15, further comprising a strut mounted to an end of the support arm and configured to introduce a tensile force and/or compressive force.

17. The industrial application of claim 12, further comprising a strut having one end mounted to one end of the first support and another end mounted to one end of the second support for bending-moment-free introduction, relative to a flange main plane, of a tensile force or compressive force into the first or second support flange.

18. The industrial application of claim 12, wherein at least one member selected from the group consisting of the first support and the second support is equipped with an attachment bearing.

19. The industrial application of claim 12, wherein at least one of the first support flange and the second support flange has at least one section which is radially shortened so as to reduce a main axis distance between the first and second gearings.

20. The industrial application of claim 12, wherein at least one of the first support flange and the second support flange is configured to form a housing component of the first or second gearing.

* * * * *